C. B. KIRKHAM AND A. L. THURSTON.
FUSELAGE.
APPLICATION FILED OCT. 14, 1918.
1,392,278.
Patented Sept. 27, 1921.
6 SHEETS—SHEET 4.
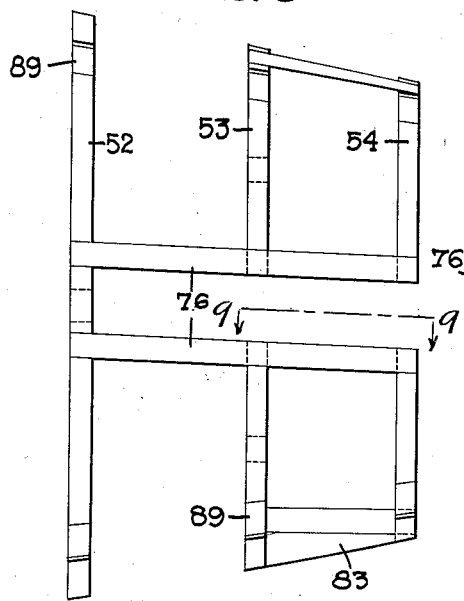
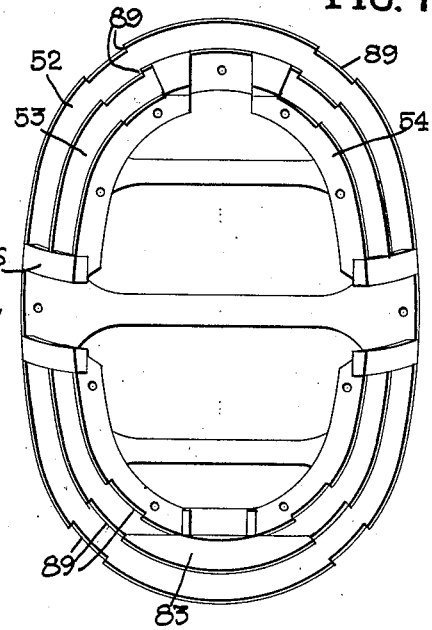
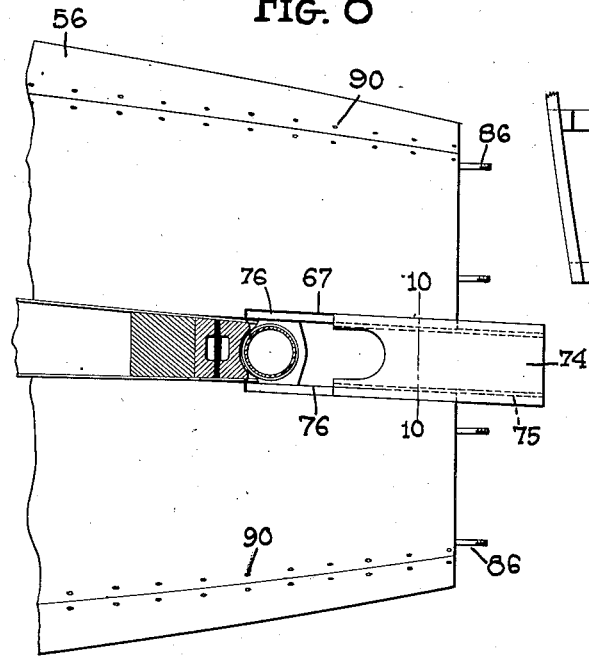
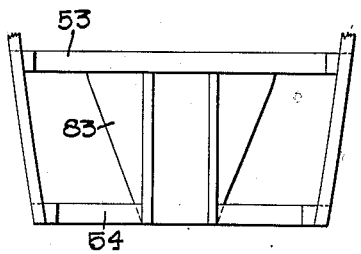
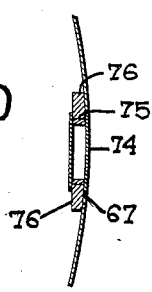
Inventors
CHARLES B. KIRKHAM
ARTHUR L. THURSTON

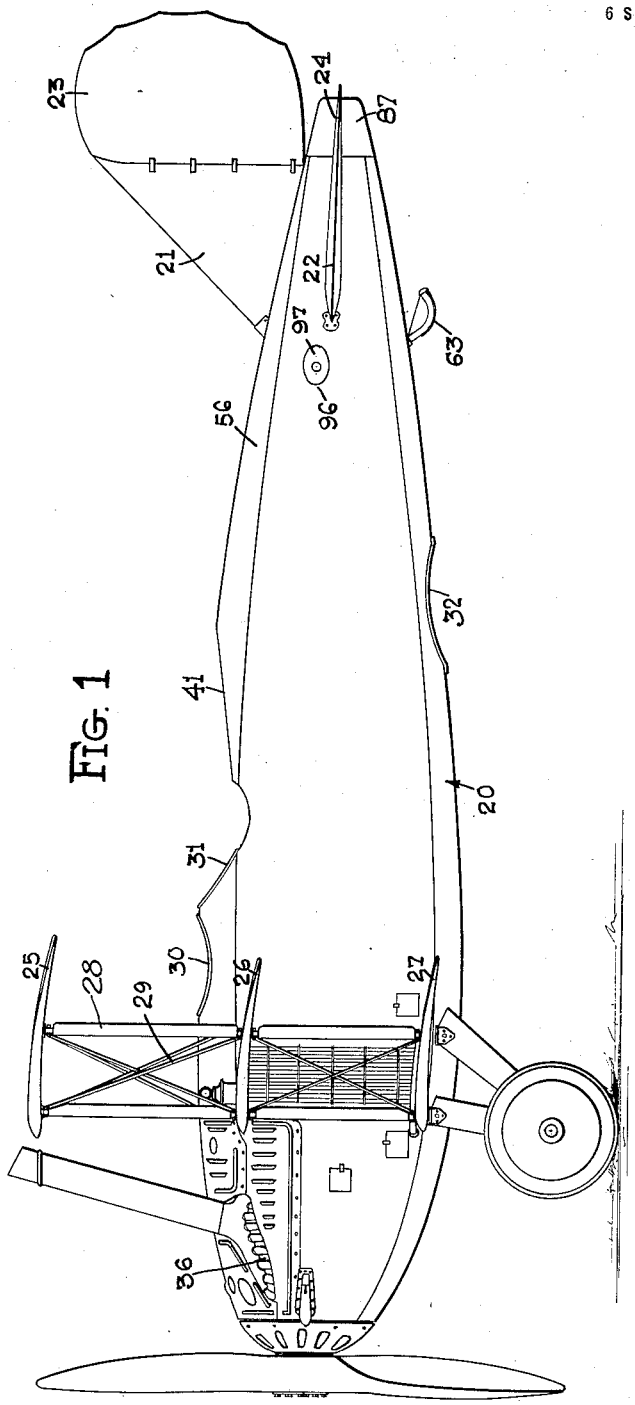

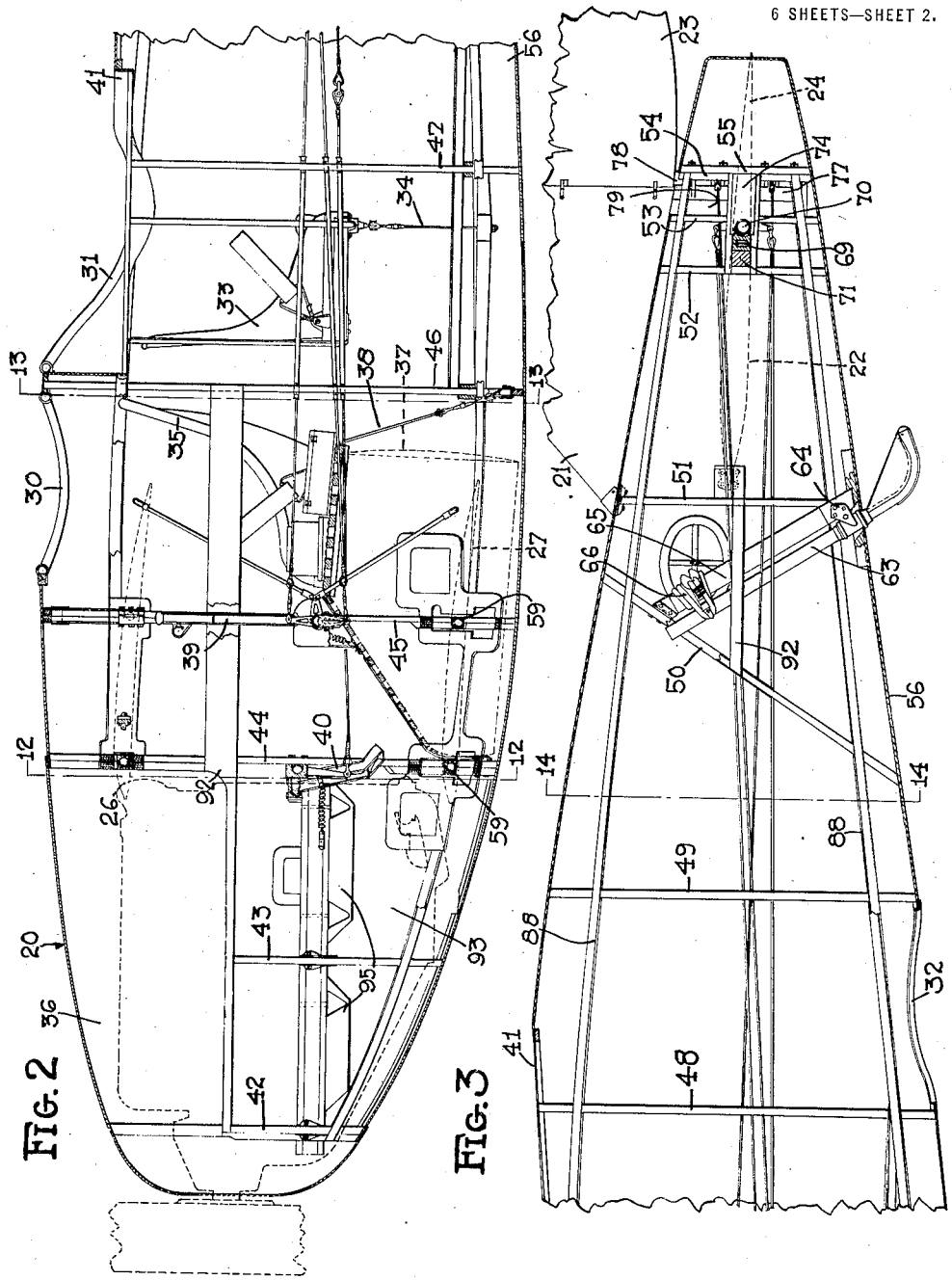

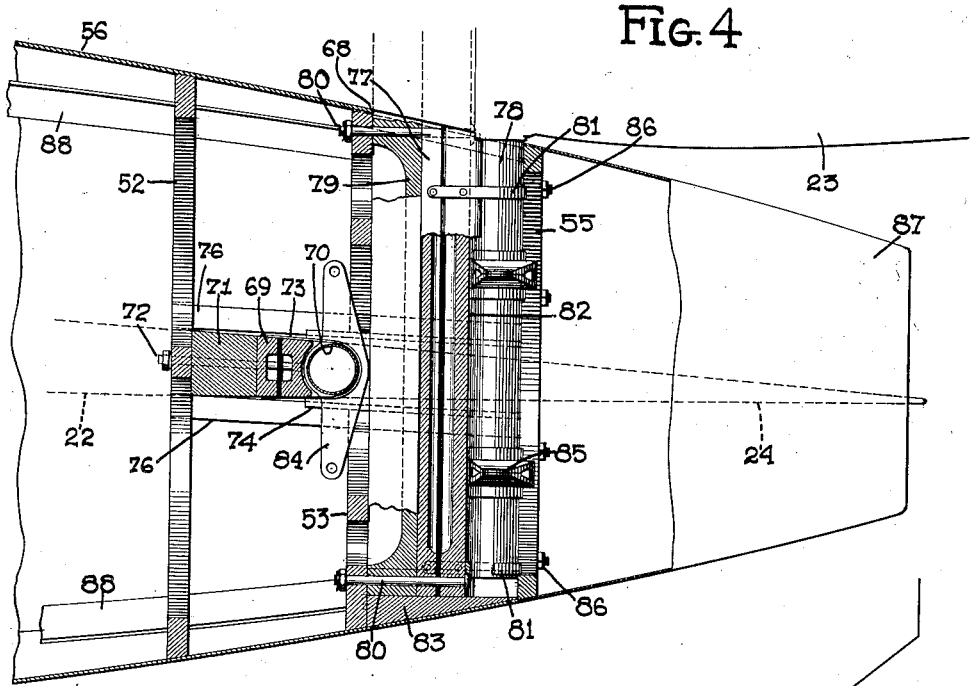
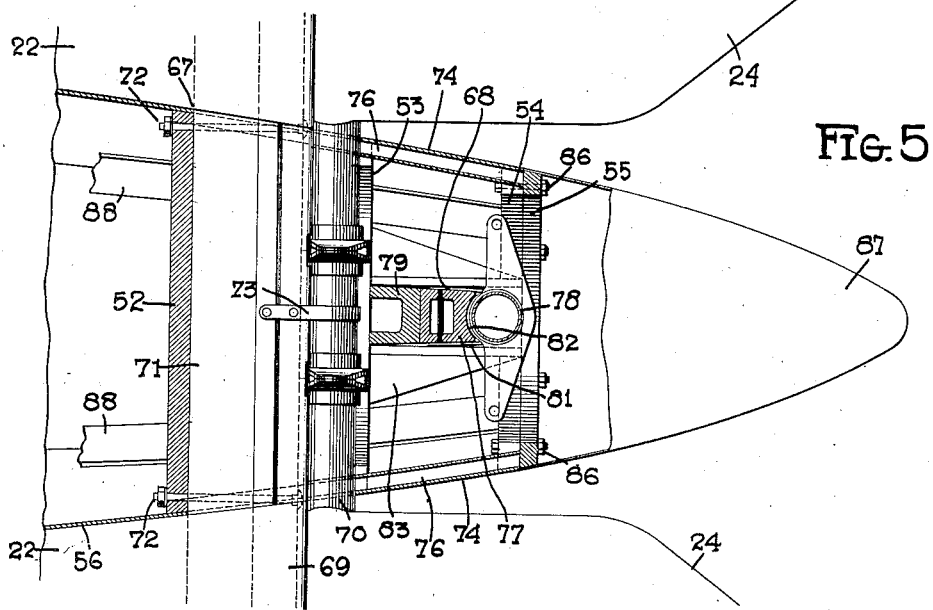

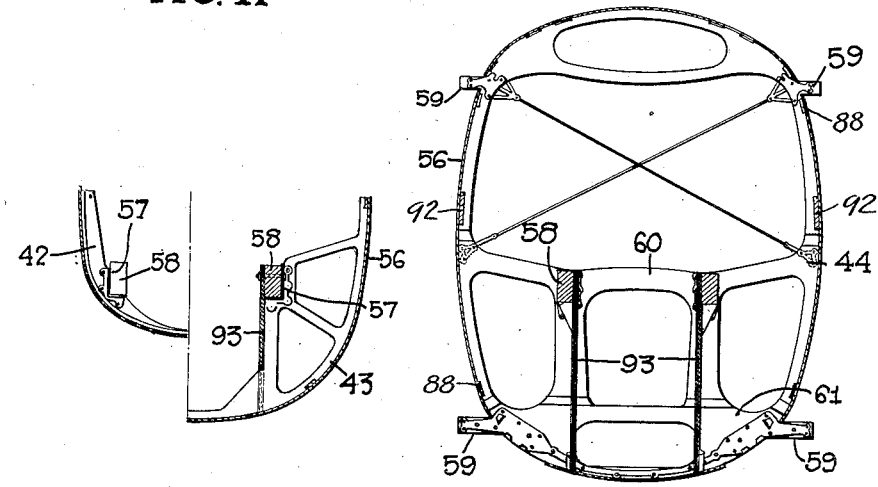
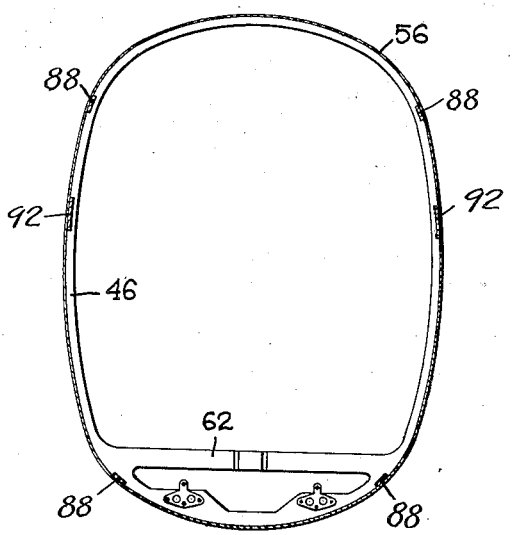
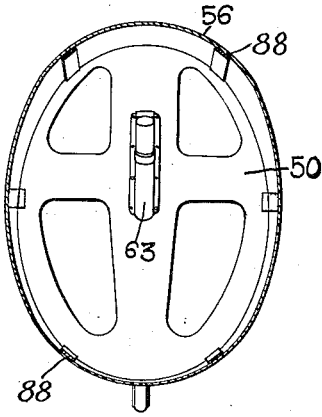

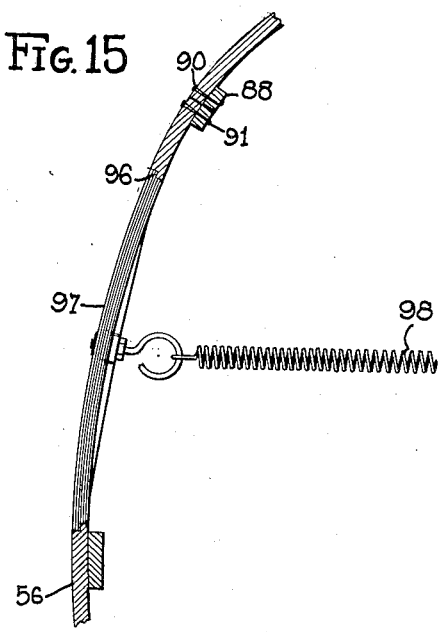
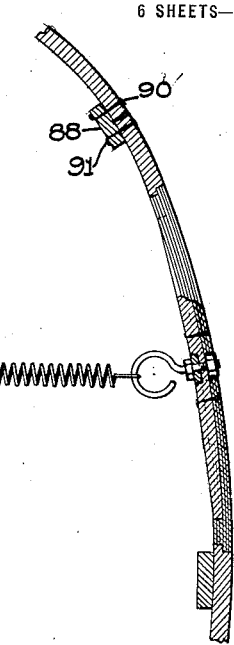
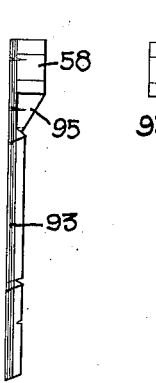
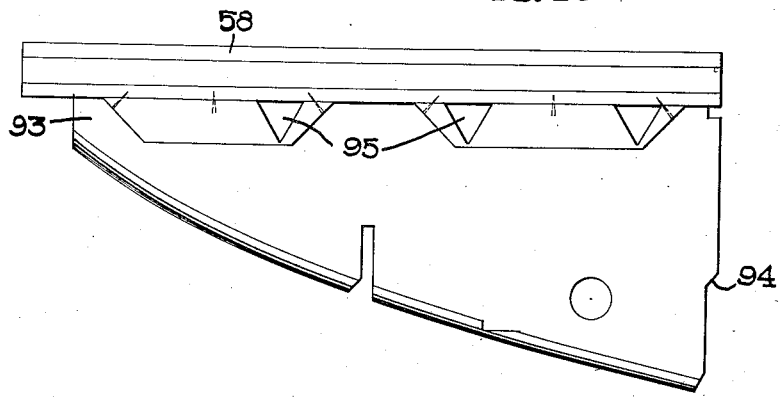

UNITED STATES PATENT OFFICE.

CHARLES B. KIRKHAM, OF GARDEN CITY, AND ARTHUR L. THURSTON, OF HEMPSTEAD, NEW YORK, ASSIGNORS TO CURTISS AEROPLANE AND MOTOR CORPORATION, A CORPORATION OF NEW YORK.

FUSELAGE.

1,392,278.    Specification of Letters Patent.    Patented Sept. 27, 1921.

Application filed October 14, 1918. Serial No. 258,102.

*To all whom it may concern:*

Be it known that we, CHARLES B. KIRKHAM and ARTHUR L. THURSTON, citizens of the United States, residing at Garden City and Hempstead, respectively, in the county of Nassau and State of New York, have invented certain new and useful Improvements in Fuselages, of which the following is a specification.

Our invention relates to fuselages for airplanes and more particularly to fuselages of the shell or monocoque type. Fuselages of this character are of more or less recent development and from a production standpoint are far superior to the conventional type wherein longérons, struts, fittings and wires are used. This latter type is invariably characterized by triangular or rectangular cross section (undesirable because of the impossibility of obtaining a good streamline contour) and is costly of production and troublesome in assembly in view of the large number of special fittings required. The monocoque type, conversely, is comparatively inexpensive, simple in construction and vastly better aerodynamically; especially the latter, since the fuselage in a fore and aft direction may be effectually streamlined and in cross section given a continuously curvilinear form.

An important characteristic of the invention is the use of a plural number of separately formed strips or sheets of veneer (or its equivalent) upon the exterior of the fuselage frame work, the several strips of veneer being so relatively arranged that the longitudinal edges of adjacent strips abut in a fore and aft direction and preferably extend substantially the full length of the fuselage. Heretofore the use of veneer has been limited to fuselages of angular cross section except in isolated instances wherein it has been proposed to wrap the veneer spirally about a removable core. This latter form of fuselage construction is equally as costly as fuselages of angular cross section as the spiral wrapping of the veneer requires infinite care and precision and necessitates the use of two or more layers, the layers being oppositely spiraled to secure uniform strength. By arranging the veneer strips longitudinally of the body but a single layer of veneer is required. These separate strips or sheets of veneer are preferably given a definite shape before their application. In shaping them dies are provided of a configuration identical with that of the fuselage. The veneer is then pressed over the dies until its shape, when removed, is such that the strips coincide approximately with the particular fuselage section to which they are applied. All bending and cutting of the fuselage strips in applying them to fuselages of continuously curvilinear cross section is thus avoided and only a minimum of material utilized. Moreover, the weight of fuselages thus constructed is considerably less than fuselages involving a spiral wrapping of the veneer and the strength greater and the fuselage better in all respects than the conventional type of fuselage mentioned hereinbefore.

Another characteristic of the invention is the use of transverse diaphragms or bulk heads of a special construction or design entailing a minimum of weight with maximum strength. At the tail end of the fuselage the diaphragms are constructed in multi-part form. The arrangement of the sections comprising the divided diaphragms permits of the formation of longitudinally extending slots or recesses in the fuselage. These slots are so situated that they respectively receive structural elements of certain of the aerofoils constituting the empennage as it is desirable in the interest of high speed to inclose certain of the structural elements of the aerofoils and more particularly the lever arms usually provided in connection with the rear control surfaces of the machine. The constructional details of the fuselage at its rear end and the relative arrangement of the diaphragms will be hereinafter more fully explained.

Still another characteristic of the invention is the support of the engine bed by means of an improved truss involving plates dependent from the respective engine bed beams. These plates extend longitudinally of the fuselage throughout substantially the full length of the engine bed and are deeper at the rear end of the engine bed than at the forward end thereof. At their deeper end they abut one of the transverse diaphragms of the fuselage to constitute it (the diaphragm) a structural element of the engine bed support. Furthermore, the arrangement of the plates is such that they take up substantially the full thrust effort of the propeller and distribute it not only throughout a number of the transverse diaphragms but throughout the veneer covering of the fuselage as well.

The invention is still further characterized by a diaphragm construction in which lugs or projections are formed upon certain of the diaphragms for the direct attachment of the airplane wings.

Each of the above mentioned characteristics is a distinct feature of the fuselage construction herein disclosed. In cross section the fuselage throughout its full length is substantially elliptical while in longitudinal section it is of an excellent streamline form. It is provided with a relatively blunt nose plate at its forward end and with a tapering tail cap at its rear end, the tail cap being detachable and so related to the fuselage proper that it serves not only as a streamline continuation of the latter but as a means directly useful in securing to the fuselage the units constituting the empennage. Other constructional features of the invention, also important from a production as well as a structural point of view, will be hereinafter more fully explained.

Of the drawings:

Figure 1 is a side elevation of an airplane having a fuselage of the character herein disclosed;

Fig. 2 is a longitudinal vertical sectional view of the forward portion of the fuselage;

Fig. 3 is a longitudinal vertical sectional view of the after portion of the fuselage;

Fig. 4 is a detailed longitudinal vertical sectional view of the tail end portion of the fuselage showing the relative arrangement of the aerofoils comprising the empennage;

Fig. 5 is a transverse longitudinal sectional view of that portion of the fuselage illustrated in Fig. 4;

Fig. 6 is a side elevation of the tail end of the fuselage stripped of its veneer covering and associated empennage parts;

Fig. 7 is a rear end elevation of that portion of the fuselage illustrated in Fig. 6;

Fig. 8 is a side elevation of the tail end of the fuselage illustrating the transverse longitudinal slot formation, slide, and securing means for the movable tail end section of the fuselage;

Fig. 9 is a section on the line 9—9 of Fig. 6;

Fig. 10 is a section on the line 10—10 of Fig. 8;

Fig. 11 is a front end elevation, partly in section, of that portion of the fuselage defined by the two foremost diaphragms;

Fig. 12 is a section on the line 12—12 of Fig. 2;

Fig. 13 is a section on the line 13—13 of Fig. 2;

Fig. 14 is a section on the line 14—14 of Fig. 3;

Fig. 15 is a fragmentary transverse sectional view of the fuselage illustrating the arm hole cover attaching means;

Fig. 16 is a side elevation of the engine bed illustrating its support; and

Fig. 17 is a front end elevation of one of the engine bed beams and its associated support.

In the embodiment of the invention selected for illustration the fuselage designated in its entirety by the numeral 20 is shown as forming a part of a land machine of the triplane type. The fuselage at its rear end is equipped with the usual vertical stabilizer 21, horizontal stabilizer 22, vertical rudder 23 and elevator flaps 24. These aerofoil surfaces constitute the empennage of the machine. The supporting surfaces 25, 26 and 27 are preferably directly superposed and with the wing struts 28 and wires 29 constitute the wing structure. Two of the supporting surfaces, 26 and 27, are directly attached to the fuselage 20 while the third supporting surface, 25, is carried across the top of the fuselage at a point sufficiently removed therefrom to enable the occupant of the forward cockpit to have an unobstructed range of vision directly ahead. The cockpits, of which there are two, are arranged in tandem and designated respectively 30 and 31. The occupant of the rear cockpit 31, in addition to his range of vision rearwardly and upwardly has a range of vision directly beneath and to the rear of the machine. To secure this wide range of vision the fuselage is provided with a combined sight and gun fire opening 32 so situated with respect to the gunner's seat 33 that the gunner, should occasion demand, can, by stooping, fire through the opening and can, without stooping, see all that transpires directly beneath and to the rear of the machine. The gunner's seat 33 is mounted preferably as indicated in Fig. 2, i. e., suspended from the gun ring (diagrammatically indicated) to turn with it about a vertical axis indicated by the swivel conection 34. In addition to the gunner's seat 33 a pilot's seat 35 is provided. The two seats are arranged back to back, the seat 35 being relatively fixed and so situated with respect to the motor 36 that the occupant thereof may at all times control its speed. Beneath the seat 35 the fuel tank is located. The shape of the fuel tank in side elevation is such that its top surface offers an inclined leg rest for the pilot. Straps 38 provide a means for holding the tank 37 against movement. The control mechanism for the craft is also conveniently located in proximity to the seat 35. It preferably comprises a control stick or lever 39 and appropriate foot control mechanism 40, the former being so situated with respect to the seat 35 as to occupy the space between the pilot's legs and the latter so situated with respect to the motor 36 and the inclined foot rest (undesignated) as to cause the pilot to straddle the engine bed in operating the foot control and during its operation utilize the foot rest, if desired. Although, illustrated and described, the relative arrangement of the fuselage equipment is only preferred as the invention relates to the fuselage construction *per se* rather than to the general arrangement of the accessories with which it is equipped.

As intimated hereinbefore the fuselage or body is of the shell or monocoque type. In cross section it is continuously curvilinear and preferably elliptical, the ellipses defining the cross sectional area greatly decreasing in size both fore and aft from a point at or near that section of the fuselage, constituting the wing section thereof. At the gunners cockpit 31 the elliptical cross section of the fuselage is mutilated for a short distance, as indicated at 41 for the purpose of providing a relatively flat surface over which the machine gun (not shown) is movable in a circular path. With the exception of the cockpit openings, the combined sight and gun fire opening 32 and the flattened surface 31, the cross sectional lines of the fuselage are substantially elliptical throughout.

The framework of the fuselage comprises a number of transverse diaphragms designated respectively from the foremost to the rearmost as 42, 43, 44, 45, 46, 47, 48, 49, 50, 51, 52, 53, 54 and 55. These diaphragms are preferably constructed of multi-ply veneer. The foremost diaphragms 42 and the diaphragm 43 next adjacent thereto may be described as of substantially U-shape in side elevation. Both of these diaphragms are notched as indicated at 57 to receive the outside and bottom edges respectively of the engine bed beams 58. Together these two diaphragms constitute a means bracing the engine bed laterally and from beneath. The diaphragm 43 braces the engine bed intermediately of its ends while the diaphragm 42 is preferably mounted at the extreme forward end thereof.

The diaphragms 44 and 45 in addition to providing elements of the fuselage framework constitute supports for the wings 26 and 27 of the triplane wing structure. These two diaphragms are provided with lugs 59 which project out laterally beyond the sides of the fuselage through openings formed in the veneer covering 56. Two lugs are provided for each airplane wing. The diaphragm 44 also functions as an element of the engine bed support. Unlike the diaphragm 45 the diaphragm 44 is cross braced as indicated at 60 (Fig. 12) in the plane of the engine bed to provide anchorages for the engine bed beams 58 at their rear ends. Moreover, the diaphragm 44 is enlarged or thickened at its base as indicated at 61 for reasons hereinafter set forth.

The diaphragms 46, 47, 48 and 49 are of a more or less uniform construction. These diaphragms are cross braced as indicated at 62 (Fig. 13) to provide supports for the fuselage flooring.

The diaphragm 50, unlike the remaining diaphragms, is forwardly and downwardly inclined from the top of the fuselage. Being thus inclined it is utilized as a guide for the skid bar 63 of the tail skid. The skid bar 63 at its upper forward end is let through the diaphragm 50 and at its transverse pivot axis is fastened as indicated at 64 at or near the foot of the diaphragm 51. The skid bar 63 together with the skid bar support 65 and elastics 66 constitutes the tail skid of the machine. Since the tail skid enters into and forms a part of the landing gear its constructional features will not be herein set forth.

The four rearmost diaphragms 52, 53, 54 and 55 bear a certain definite relation to each other. The foremost of these diaphragms, 52, like the remaining diaphragms hereinbefore described and like the diaphragm 55, is of a one piece construction. The diaphragm 53, next adjacent the diaphragm 52 is of a two piece construction while the diaphragm 54 (the rearmost diaphragm of the fuselage proper) is of a four piece construction. (See Fig. 7.) The diaphragm 53 is transversely divided and the diaphragm 55 transversely and vertically divided to receive structural elements of the empennage aerofoils 21, 22, 23 and 24.

In the vicinity of the space between the sections constituting the divided diaphragms the covering 56 of the fuselage is slotted as indicated at 67 and 68, the slots 67 receiving structural elements of the horizontal stabilizer 22 and the elevator flaps 24 and the slots 68, structural elements of the vertical stabilizer 21 and the vertical rudder 23. The slots 67 are deeper than the slots 68 by an extent equal to the distance between the diaphragms 52 and 53. In other words, the diaphragm 53 defines the inner ends of the slots 68 while the diapragm 52 defines the inner ends of the slots 67.

In assemblying the aerofoils constituting the empennage the horizontal stabilizer beam 69 and the leading edge beam 70 of the elevator flaps are let into the slots 67 until the reënforcement 71 of the stabilizer beam 69 lies flat against the diaphragm 52 and the beam 70 close up against the trailing edge of the beam 69 which is channeled to receive it. The beam 69 is then bolted to the diaphragm as indicated at 72 and the beam 70 fastened to the beam 69 by any suitable means such as the straps indicated at 73 (Fig. 4).

As a means for closing the unoccupied portions of the slots 67 slides 74 are provided. These slides (see Figs. 8 and 10) have their longitudinal edges grooved as indicated at 75 to receive strips 76 which interconnect the three diaphragms 52, 53 and 54 and define the longitudinal edges of the slots.

After assemblying the aerofoils 22 and 24 the aerofoils 21 and 23 are assembled. In assembling the last mentioned aerofoils the vertical stabilizer beam 77 and the vertical rudder post 78 are let into the slots 68 of the fuselage. As the trailing edge of the rudder post 78 is in line with the rear end of the slots 68, slides such as 74 are not needed. The vertical stabilizer beam 77 like the horizontal stabilizer beam 69 is reinforced as at 79 and bolted as at 80 to the diaphragm 53 which defines the inner ends of the slots 68. Straps 81 are provided for the rudder post 78 for holding its leading edge in engagement with the vertical stabilizer beam 77 which is channeled as at 82. Accordingly both the vertical rudder 23 and the elevator flaps 24 are movable about their respective axes without interference, the axis of the one set of aerofoils being longitudinally removed from the other.

As a further support for the vertical stabilizer 21 and vertical rudder 23 the bottom of the fuselage at a point between the diaphragm 53 and 54 is reinforced as at 83. This reinforcement underlies the bottom slot 68 of the fuselage and affords a rest for the bottom end of the stabilizer beam 77. Such reinforcement however is only preferred and may be dispensed with if the beam 77 is carried beyond the bottom of the fuselage as it is in a number of machines.

The diaphragm 55, although a fuselage diaphragm, is not a diaphragm forming a part of the fuselage proper. It is directly fastened to the rear diaphragm 54 by bolts 86 and offers a securing means for the cap 87 provided at the tail end of the fuselage. This cap 87 is of streamline form and is preferably constructed of sheet metal (aluminum). Its sole function is to continue the lines of the fuselage to an edge.

The framework of the fuselage in addition to the diaphragms 42 to 55 inclusive comprises stringers 88, four in number, arranged to extend longitudinally of the fuselage throughout substantially its full length. The diaphragms are notched as at 89 to receive the stringers which are fastened in the notches with their flat faces outermost. The stringers collectively offer a foundation for the fuselage covering 56. The covering comprises preferably but four longitudinally elongated strips or sheets of veneer arranged to cover respectively the top, bottom and sides of the fuselage. The edges of the veneer strips abut in a fore and aft direction and parallel the stringers throughout their full length. The adjacent edges of the strips are nailed to the stringers as indicated at 90 and clenched in place as indicated at 91 (Fig. 15).

Before applying the veneer covering to the fuselage each of the several sections or strips of veneer is either bent or shaped until its inside face approximately conforms to the exterior configuration of the fuselage framework. This bending or shaping of the veneer is effected by a well known process that need not be herein disclosed, although, as stated in the preamble, dies are used and the veneer strips otherwise treated with the result that each strip holds its shape indefinitely and regardless of atmospheric changes. By using four separate strips of veneer as the covering for the top, bottom and sides of the fuselage respectively a very minimum of material is required as it is then possible to so arrange the longitudinal edges of the adjacent strips that they will abut in a fore and aft direction to give strength to the fuselage even greater than that which would result from a unitary construction. The stringers 88 offer a means to attach the veneer and also provide a means for holding the diaphragms in proper spaced relation during the assembly of the fuselage. The diaphragms it will be noted are definitely spaced and so relatively arranged that at least one diaphragm is located at that point in the fuselage wherein it is necessary to attach thereto, either upon the exterior or interior, such element or elements thereof as the vertical stabilizer, horizontal stabilizer or fuel tank.

There is also provided at points throughout the longitudinal extent of the fuselage framework a number of reinforcing strips such as are indicated at 92. These strips, in addition to the stringers 88, offer a foundation for the veneer and at the same time tend to strengthen the fuselage covering.

The engine bed support comprises in addition to the diaphragms 42, 43, and 44 dependent plates 93 arranged respectively vertically beneath the engine bed beams 58. These plates (see Fig. 16) together constitute a support for the engine bed and at the same time distribute the thrust effort of the propeller (not shown) over a considerable portion of the fuselage framework. The rear edges of the dependent plates are shaped to lie flush against the diaphragm 44 for it is this diaphragm which is enlarged as at 130

61 to function with the plates 93 as the principal engine bed support. In this connection it will be noted that the aprons 93 are notched as at 94 to accommodate the enlargement 61 of the diaphragm and as a result bear directly upon it. For added strength the engine bed beams are reinforced as indicated at 95 that the weight of the motor may be directly carried to the plates.

In Fig. 15 of the drawings an improved form of arm hole cover fastening means is disclosed. The fuselage herein at or near the tail skid section is provided with two arm holes 96, one in each side of the fuselage. Arm hole covers 97 are provided for these arm holes and held in place by a spring 98 interconnecting them. To remove the covers it is but necessary that one of them be withdrawn against the tension of the spring until the hand can be inserted to effect the release of the spring in which event both covers may be freely removed.

In view of the fact that the vertical rudder post and the horizontal elevator beam are carried into the fuselage and the further fact that the confined portions thereof are equipped with control means or lever arms it is obvious that a minimum of head resistance is offered by the tail structure shown. In addition to this decrease in resistance, the arrangement of the stabilizing beams is such that the two stabilizing surfaces may be said to constitute a composite part of the fuselage itself as the said beams are not only deeply embedded in the fuselage but directly braced by the longitudinal edges of the slots within which they are seated. This and other constructional features characterizing the machine tend to not only increase its operating efficiency but to heighten its factor of safety without a utilization of the exposed braces heretofore present in the vast majority of machines.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:

1. A fuselage for airplanes including a transverse diaphragm provided with integral lugs which serve as anchorages for the airplane wings.

2. A fuselage for airplanes including a transverse diaphragm, covering for the fuselage, and lugs formed upon the diaphragm to project laterally out beyond the covering for the attachment of the airplane wings.

3. A fuselage for airplanes including a transverse diaphragm, covering for the fuselage, and recessed lugs formed on the diaphragm to project laterally out beyond the covering for the attachment of the airplane wings.

4. In an airplane fuselage, an engine bed including engine bed beams, means inside the fuselage for bracing the engine bed laterally, and longitudinally extended plates dependent from the engine bed beams for supporting the engine bed from beneath.

5. In an airplane fuselage, an engine bed including engine bed beams, and a support for the engine bed comprising longitudinally extending plates dependent from the engine bed beams, the plates being deeper at or near the rear end of the engine bed than at or near its forward end.

6. In an airplane, an engine bed including engine bed beams, a transverse diaphragm mounted insid the fuselage at the rear end of the engine bed, and a support for the engine bed comprising plates dependent from the engine bed beams forwardly of the transverse diaphragm, the rear ends of the plates being in engagement with the forward face of the diaphragm.

7. In an airplane fuselage, a covering for an opening formed in the fuselage, and means extended across the inside of the fuselage for yieldingly holding the covering over said opening.

8. In an airplane fuselage, separate covers for two openings formed in the fuselage and a yielding connection between the separate covers for holding them over said openings.

9. In an airplane, the combination with an aerofoil, of an inclosed fuselage provided with a rear end longitudinal slot within which an element of the aerofoil framework is fitted, and means for preventing displacement of the aerofoil relatively to the slot.

10. In an airplane, the combination with a vertical aerofoil and a horizontal aerofoil, of a fuselage having its rear end longitudinally slotted both vertically and horizontally to receive elements respectively of the vertical aerofoil framework and the horizontal aerofoil framework, and means for preventing displacement of both aerofoils relatively to the slots.

11. In an airplane, the combination with two aerofoils, of a fuselage having its rear end longitudinally slotted in intersecting planes to receive respectively elements of the two aerofoils, one of the slots being carried deeper into the fuselage than the other, and means for preventing displacement of the aerofoils relatively to the slots.

12. In an airplane, the combination with an aerofoil, of a fuselage having its rear end slotted to receive an element of the aerofoil, a diaphragm mounted inside the fuselage against which the inclosed portion of the aerofoil is fitted, and means for preventing displacement of the aerofoil relatively to the slot.

13. In an airplane, the combination with an aerofoil, of a fuselage having its rear end slotted to receive an element of the aerofoil, and a slide for closing that portion of the slot unoccupied by that portion of the aerofoil passing therethrough.

14. In an airplane fuselage, a divided diaphragm mounted inside the fuselage at its rear end, a second diaphragm mounted inside the fuselage at a point forwardly removed from the divided diaphragm, and connections between the two diaphragms defining a slot.

15. In an airplane fuselage, a divided diaphragm mounted at the rear end of the fuselage, said diaphragm comprising four diaphragm sections, a divided diaphragm mounted inside the fuselage at a point forwardly removed from the diaphragm first mentioned, said last mentioned diaphragm comprising two diaphragm sections, a third diaphragm mounted inside the fuselage at a point forwardly removed from the second mentioned diaphragm, connections between the first mentioned diaphragm defining a slot, and connections between the first mentioned diaphragm and the last mentioned diaphragm defining a second slot, the length of the second slot exceeding that of the first slot by the difference in distance between the second and third diaphragms.

16. In an airplane fuselage, a detachable fuselage section mounted at the rear end of the fuselage, the fuselage at a point forwardly removed from the detachable section being provided with a slot, and means for fastening the fuselage sections together in a manner such that the forward end of the detachable fuselage section defines the rear end of the slot.

17. In an airplane fuselage, a detachable fuselage section mounted at the rear end of the fuselage, a dividend diaphragm mounted inside the fuselage immediately in front of the detachable fuselage section, a second diaphragm mounted inside the fuselage at a point forwardly removed from the divided diaphragm, and connections between the two diaphragms defining a slot, the ends of the slot being closed respectively by the detachable fuselage section and the second mentioned diaphragm.

18. In an airplane, the combination with the empennage, of a transversely divided fuselage, the arrangement of the empennage and the transversely divided fuselage being such that a structural element of the former is extended into the fuselage at a point forwardly of the dividing line between the fuselage sections.

19. In an airplane, the combination with the empennage, of a transversely divided fuselage comprising connected fuselage sections, one of the sections of the fuselage being relatively small and so arranged with respect to the other of the fuselage sections as to constitute a rearward streamline prolongation thereof, means for fastening the fuselage sections together, and an element incorporated in and forming a part of the empennage, said element being extended through the fuselage at a point forwardly removed from the dividing line between the fuselage sections.

20. In an airplane, the combination with the empennage, of a transversely divided fuselage, the rear end of the forward fuselage section being provided with an open end longitudinal slot within which a structural element of the empennage is fitted, means for fastening the two fuselage sections together, the rear fuselage section when fastened to the forward fuselage section providing a closure for the open end of the slot.

In testimony whereof we hereunto affix our signatures.

CHARLES B. KIRKHAM,
ARTHUR L. THURSTON.